United States Patent
Cook, III et al.

(10) Patent No.: US 10,661,380 B2
(45) Date of Patent: May 26, 2020

(54) METHOD FOR JOINING DISSIMILAR ENGINE COMPONENTS

(71) Applicant: United Technologies Corporation, Farmington, CT (US)

(72) Inventors: Grant O. Cook, III, Spring, TX (US); Kevin W. Schlichting, South Glastonbury, CT (US); Venkatarama K. Seetharaman, Rocky Hill, CT (US)

(73) Assignee: United Technologies Corporation, Farmington, CT (US)

( * ) Notice: Subject to any disclaimer, the term of this patent is extended or adjusted under 35 U.S.C. 154(b) by 389 days.

(21) Appl. No.: 15/451,228

(22) Filed: Mar. 6, 2017

(65) Prior Publication Data

US 2017/0173729 A1    Jun. 22, 2017

Related U.S. Application Data

(63) Continuation of application No. 14/912,321, filed as application No. PCT/US2014/051303 on Aug. 15, 2014, now Pat. No. 9,586,868.
(Continued)

(51) Int. Cl.
*B23K 20/00* (2006.01)
*C04B 37/00* (2006.01)
(Continued)

(52) U.S. Cl.
CPC .............. *B23K 20/16* (2013.01); *B23K 20/00* (2013.01); *B23K 35/3053* (2013.01);
(Continued)

(58) Field of Classification Search
CPC ......... Y10T 29/49336; Y10T 29/49337; Y10T 428/12493; B23K 20/00; B23K 20/021;
(Continued)

(56) References Cited

U.S. PATENT DOCUMENTS 3,768,985 A    10/1973    Woodward
4,611,752 A *  9/1986    Jahnke ................... B23K 20/16
                                                            228/194

(Continued)

FOREIGN PATENT DOCUMENTS

EP        1238741 A1      9/2002
WO    WO92/08681 A1      5/1992

OTHER PUBLICATIONS

Grant O. Cook III—Carl D. Sorensen, "Overview of transient liquid phase and partial transient liquid phase bonding", J Mater Sci (2011) 46:5305-5323.

(Continued)

*Primary Examiner* — Erin B Saad
(74) *Attorney, Agent, or Firm* — Kinney & Lange, P.A.

(57) ABSTRACT

A method for joining engine components includes positioning a first plurality of thermal protection structures across a thermal protection space between a first thermal protection surface and a second thermal protection surface. The first and second engine components are locally joined by forming a first plurality of transient liquid phase (TLP) or partial transient liquid phase (PTLP) bonds along corresponding ones of the first plurality of thermal protection structures between the first thermal protection surface and the second thermal protection surface. The second thermal protection surface is formed from a second surface material different from a first surface material of the first thermal protection surface.

22 Claims, 6 Drawing Sheets

Related U.S. Application Data

(60) Provisional application No. 61/871,703, filed on Aug. 29, 2013.

(51) Int. Cl.
| | |
|---|---|
| *B23K 20/16* | (2006.01) |
| *B23K 35/32* | (2006.01) |
| *B23K 35/30* | (2006.01) |
| *B23K 35/36* | (2006.01) |
| *B32B 15/01* | (2006.01) |
| *C04B 37/02* | (2006.01) |
| *F01D 5/28* | (2006.01) |
| *F01D 5/12* | (2006.01) |

(52) U.S. Cl.
CPC ............ *B23K 35/32* (2013.01); *B23K 35/327* (2013.01); *B23K 35/3601* (2013.01); *B23K 35/3602* (2013.01); *B23K 35/3606* (2013.01); *B32B 15/01* (2013.01); *C04B 37/001* (2013.01); *C04B 37/003* (2013.01); *C04B 37/006* (2013.01); *C04B 37/023* (2013.01); *C04B 37/026* (2013.01); *F01D 5/288* (2013.01); *C04B 2235/524* (2013.01); *C04B 2235/5224* (2013.01); *C04B 2235/5244* (2013.01); *C04B 2235/5248* (2013.01); *C04B 2237/122* (2013.01); *C04B 2237/123* (2013.01); *C04B 2237/124* (2013.01); *C04B 2237/125* (2013.01); *C04B 2237/16* (2013.01); *C04B 2237/343* (2013.01); *C04B 2237/348* (2013.01); *C04B 2237/36* (2013.01); *C04B 2237/365* (2013.01); *C04B 2237/368* (2013.01); *C04B 2237/38* (2013.01); *C04B 2237/40* (2013.01); *C04B 2237/401* (2013.01); *C04B 2237/402* (2013.01); *C04B 2237/403* (2013.01); *C04B 2237/405* (2013.01); *C04B 2237/406* (2013.01); *C04B 2237/595* (2013.01); *C04B 2237/60* (2013.01); *C04B 2237/62* (2013.01); *C04B 2237/64* (2013.01); *C04B 2237/72* (2013.01); *F01D 5/12* (2013.01); *F05D 2220/32* (2013.01); *F05D 2230/23* (2013.01); *F05D 2230/236* (2013.01); *F05D 2240/35* (2013.01); *F05D 2300/21* (2013.01); *F05D 2300/2112* (2013.01); *F05D 2300/2118* (2013.01); *F05D 2300/22* (2013.01); *F05D 2300/224* (2013.01); *F05D 2300/2261* (2013.01); *F05D 2300/2263* (2013.01); *F05D 2300/2283* (2013.01); *F05D 2300/2284* (2013.01); *F05D 2300/5023* (2013.01); *F05D 2300/5024* (2013.01); *F05D 2300/6032* (2013.01); *F05D 2300/6033* (2013.01)

(58) Field of Classification Search
CPC ....... B23K 2201/001; E04C 2002/3488; E04C 2/34; E04C 2/3405; E04C 2/365
See application file for complete search history.

(56) References Cited

U.S. PATENT DOCUMENTS

| | | | |
|---|---|---|---|
| 5,419,040 | A * | 5/1995 | Weisse .................. B23P 15/04 29/463 |
| 5,985,368 | A * | 11/1999 | Sangeeta ................. C09D 1/00 427/376.4 |
| 6,325,871 | B1 | 12/2001 | Burke et al. |
| 6,733,907 | B2 | 5/2004 | Morrison et al. |
| 7,837,438 | B2 | 11/2010 | Campbell |
| 8,137,611 | B2 | 3/2012 | Merrill et al. |
| 8,197,211 | B1 | 6/2012 | Liang |
| 8,349,111 | B2 | 1/2013 | Akash et al. |
| 2004/0043204 | A1 | 3/2004 | Nair et al. |
| 2004/0154725 | A1 | 8/2004 | Mako et al. |
| 2006/0071056 | A1 | 4/2006 | Das |
| 2008/0035707 | A1 | 2/2008 | Glaeser |
| 2009/0068004 | A1 | 3/2009 | Benoit et al. |
| 2010/0047526 | A1 * | 2/2010 | Merrill .................. C04B 35/80 428/163 |
| 2013/0001782 | A1 | 1/2013 | Otsuka et al. |

OTHER PUBLICATIONS

International Search Report and Written Opinion from PCT Application Serial No. PCT/US2014/051303, dated Nov. 11, 2014, 8 pages.
Extended European Search Report for EP Application No. 14839589.0, dated Apr. 4, 2017, 10 pages.
Communication Pursuant to Article 94(3) EPC for EP Application No. 14839589.0, dated Feb. 17, 2020, 5 pages.

* cited by examiner

METHOD FOR JOINING DISSIMILAR ENGINE COMPONENTS

CROSS-REFERENCE TO RELATED APPLICATION(S)

This application is a continuation of U.S. application Ser. No. 14/912,321, filed Feb. 16, 2016, for "METHOD FOR JOINING DISSIMILAR ENGINE COMPONENTS" by G. O. Cook III, Kevin W. Schlichting and Venkatarama K. Seetharaman, which in turn claims the benefit of PCT International Application No. PCT/US2014/051,303, filed Aug. 15, 2014, for "METHOD FOR JOINING DISSIMILAR ENGINE COMPONENTS" by G. O. Cook III, Kevin W. Schlichting and Venkatarama K. Seetharaman, which in turn claims the benefit of U.S. Provisional Application No. 61/871,703, filed Aug. 29, 2013, for "METHOD FOR JOINING DISSIMILAR ENGINE COMPONENTS" by G. O. Cook III, Kevin W. Schlichting and Venkatarama K. Seetharaman.

BACKGROUND

The described subject matter relates generally to combustion engines and more specifically to methods for joining components for combustion engines.

Combustion engines including internal combustion engines and gas turbine engines such as turbofans, turboshafts, and turboprops provide motive power in a wide variety of industries and applications. Ground-based combustion engines such as internal combustion engines and gas or steam turbines are also used for generating electrical and/or mechanical power. Advances in material compositions and processing have led to the use of more exotic materials in an effort to improve engine efficiency. A more refractory (e.g., more thermally resistant) material could be used to insulate a less refractory material. Thermal-resistance properties generally relate to resistance of a substrate to thermally induced phase changes.

Since a more refractory material is typically heavier, more expensive, and/or lacking in a key property (e.g., ductility) than less thermally resistant materials, it would be helpful to use a less refractory material where there is less risk of exposure of that material to extreme conditions. However, there have historically been at least two issues with this approach. First, there is often a mismatch in the coefficient of thermal expansion (CTE) between materials. If the mismatch is too large, it increases thermally induced strains and the risk of premature failure at the material interface. Second, a suitable, more refractory material may still have a relatively high thermal conductivity, and does not adequately insulate the otherwise suitable less refractory material.

The issues of differential CTE and high thermal conductivity arise, among other places, in the hot section of turbine engines. For example, combustor and turbine components are exposed to hot working gases and thus are often manufactured from combinations of specialized superalloys, ceramics, and/or composites. Turbine blades and combustor parts often require vapor or thin film deposition of a metallic bond layer to form a suitable interface between a less refractory superalloy substrate and a more refractory ceramic coating. The metallic bond layer mediates the different CTEs of the superalloy substrate and ceramic coating, while also controlling conduction of heat into the superalloy substrate. Despite a mediating metallic layer, substantial practical limitations remain on usable combinations of superalloy and/or refractory ceramic substrates in other applications.

To reduce weight and improve efficiency, it would be helpful to be able to utilize the best and most cost-effective materials in all parts of the engine. This would require a number of dissimilar materials to be in close proximity to each other. However, each material is likely to have different thermal and mechanical responses. Thus designers must be extremely careful about which materials can be used together, and particularly about combinations of materials which are to be physically joined or fastened together.

SUMMARY

A method for joining engine components comprises providing a first engine component with a first thermal protection surface and a second engine component with a second thermal protection surface. The second thermal protection surface is formed from a second surface material different from a first surface material of the first thermal protection surface. The first and second thermal protection surfaces are arranged to have at least one thermal protection space therebetween. A first plurality of thermal protection structures are positioned across the thermal protection space between the first thermal protection surface and the second thermal protection surface. The first engine component and the second engine component are locally joined by forming a first plurality of transient liquid phase (TLP) or partial transient liquid phase (PTLP) bonds along corresponding ones of the first plurality of thermal protection structures between the first thermal protection surface and the second thermal protection surface.

DETAILED DESCRIPTION

Figure 1:
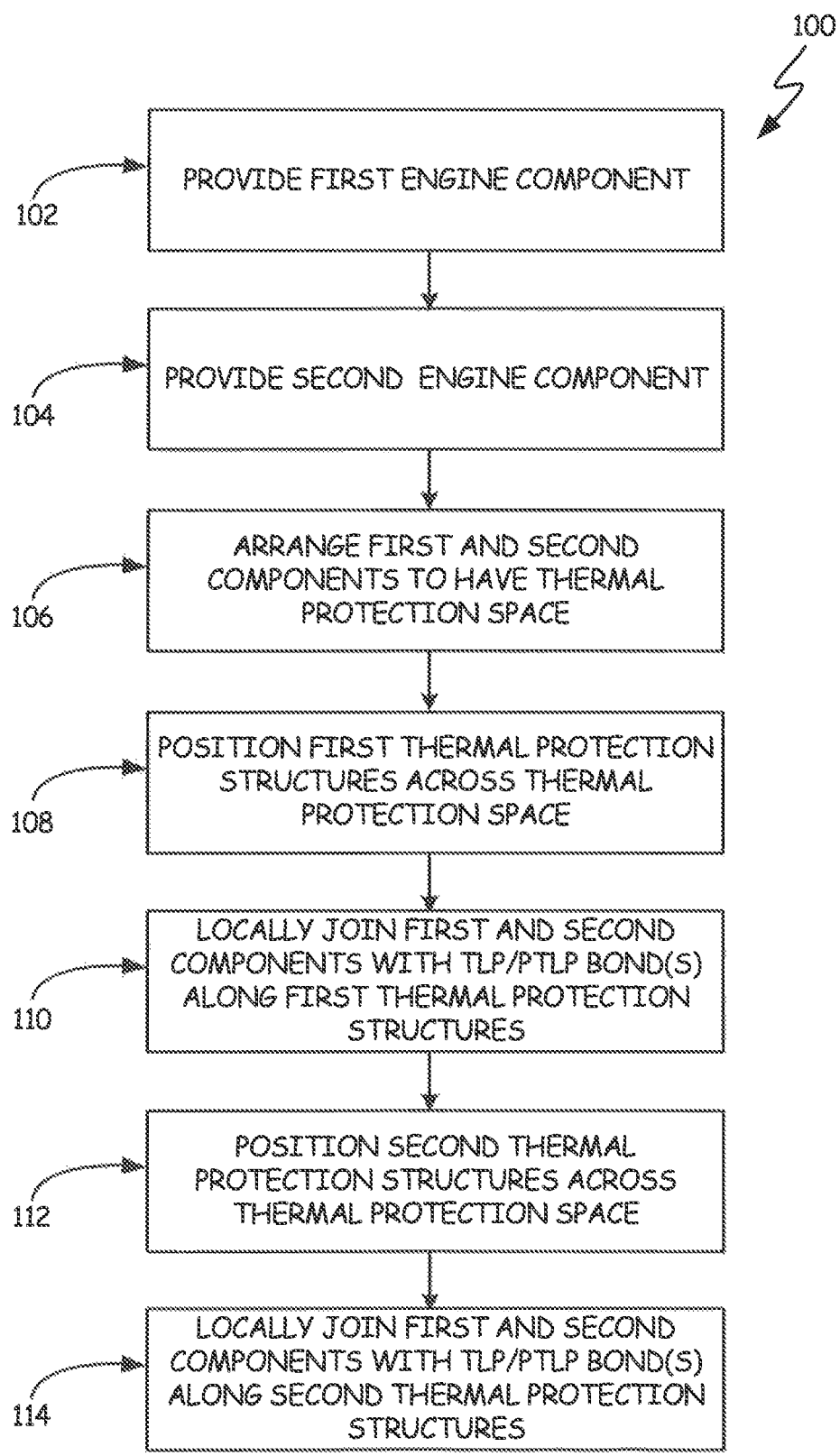
FIG. 1 is a chart showing steps of a method for joining engine components formed from dissimilar materials.

FIG. 1 shows a chart with method 100 for joining engine components with dissimilar materials. Embodiments of method 100 allow for joining of numerous combinations of components throughout internal combustion engines, gas and steam turbine engines, among others. By providing a joining method which minimizes different thermal and mechanical responses of each material, it becomes more likely that each component material can be better optimized. With careful design and selection of thermal protection structures and transient liquid phase (TLP) or partial transient liquid phase (PTLP) bonds, numerous combinations of metallic, ceramic, and composite components can be joined in a turbine or other combustion engines, which allows increased flexibility in structural material selection, reduced cooling demands, and increased efficiency. The combination of thermal protection structures and TLP or PTLP bonds can also reduce the number of fasteners, interference fits, or the like, in certain applications as they can provide robust bonds at relatively low temperatures.

Method 100 is a process for quickly and economically joining a variety of dissimilar materials in components for combustion engines including gas turbine engine components. Method 100 begins with steps 102 and 104 which respectively include providing first and second engine components. Each of the first and second engine components has respective first and second thermal protection surfaces formed from different first and second surface materials. The first surface material can have a higher melting point than the second surface material, making the first material "more refractory". The use of materials with different melting points or other thermally resistant properties can be done in the interest of reducing weight and/or cost.

Example classes of materials suitable for the first and second surfaces include but are not limited to ceramic materials, metallic materials, ceramic matrix composite (CMC) materials, and metal matrix composite (MMC) materials. Non-limiting examples of suitable ceramic and ceramic matrix materials can include aluminum oxide ($Al_2O_3$), silicon nitride ($Si_3N_4$), silicon carbide (SiC), tungsten carbide (WC), zirconium oxide ($ZrO_2$), and combinations thereof. Examples of fibers for the CMC and/or MMC materials can include but are not limited to silicon carbide (SiC), titanium carbide (TiC), aluminum oxide ($Al_2O_3$), carbon (C), and combinations thereof. Other example fibers for MMC materials can include boron (B), boron carbide ($B_4C$), graphite, steel, tungsten (W), and titanium boride ($TiB_2$), and combinations thereof. Non-limiting examples of suitable metals for the metallic materials and/or the metallic matrix materials can include aluminum, nickel, iron, titanium, and alloys thereof. As is known in the case of composites, the fibers can be coated to prevent reaction with the surrounding matrix or to provide additional contact area. A number of these materials have favorable thermal and mechanical properties for turbine engine applications.

At step 106, the first and second thermal protection surfaces are arranged in such a way as to have at least one thermal protection space therebetween. The thermal protection space can serve a number of simultaneous purposes, depending on the relative composition and properties of the two surface materials. First, a space between the surfaces may exist where one would not be feasible using other joining techniques, thereby reducing weight. In other applications, the thermal protection space can provide convective and/or impingement cooling to one or both materials. In one example of an engine case, holes could be formed through a less refractory surface, and which direct cooling air through the space toward the underside of a more refractory surface. In other examples, the arrangement could serve as a portion of a path for secondary air flow or leakage flow.

Step 108 of method 100 includes positioning a plurality of first thermal protection structures across the thermal protection space between the first thermal protection surface and the second thermal protection surface. The plurality of first thermal protection structures generally include one or more geometric shapes which, alone or together, bridge the space between the first and second thermal protection surfaces.

As part of step 110 the first component segment and the second component segment can be locally joined by forming a plurality of first TLP or PTLP bonds along corresponding ones of the plurality of first thermal protection structures between the first thermal protection surface and the second thermal protection surface. Depending on the degree of similarity or dissimilarity, the thermal protection structures may have one or more thermal protection elements which are integral to one, both, or neither of the first and second thermal protection surfaces. The thermal protection elements can additionally or alternatively be joined via one or more of the first TLP or PTLP bonds. Example configurations of TLP or PTLP bonds disposed along a thermal protection element are shown in FIGS. 2A-2D.

It will be recognized that, when referring to TLP bonding, the process can encompass one or both of a standard TLP bonding process and a partial transient liquid phase (PTLP) bonding process. PTLP bonding generally performs better than standard TLP bonding when joining two ceramic materials. References to TLP and/or PTLP bonding, when joining a metallic surface to a non-metallic surface, also include bonds with are technically termed active TLP bonds.

A combination of TLP or PTLP bonds along corresponding ones of the thermal protection structures minimize heat transfer by optimizing the conduction paths and empty thermal protection space between the first and second thermal protection surfaces. This permits the optimization of different combinations of materials, particularly in previously impractical areas of turbine engines, due to the compliance of the thermal protection structures and design flexibility of the TLP and PTLP bonding processes. Unlike other bonding processes such as sintering, diffusion bonding, etc., TLP and PTLP bonds can be used at or above the bonding temperature. This can prevent damage to the bonding/thermal protection surfaces and the components being joined.

Optional step 112 includes positioning a plurality of second thermal protection structures across the thermal protection space between the first thermal protection surface and the second thermal protection surface. In conjunction with step 112, optional step 114 describes locally joining the first component segment and the second component segment by forming a plurality of second TLP or PTLP bonds along corresponding ones of the plurality of second thermal protection structures.

Using different geometries of thermal protection structures allows organization of different (e.g. first and second) thermal protection structures according to localized thermal gradients, hot spots, or the like. First and second geometries can be combined and used to reinforce high stress areas or to avoid high strain areas of one or both materials being joined. Thus the different thermal protection structures can be graded, arranged transversely to one another, or may be placed in discrete or localized regions of the thermal protection surfaces. Example geometries are shown and described with respect to FIGS. 4A-9B.

FIGS. 2A-2D show various configurations of first engine component 200 being joined to second engine component 202. First engine component 200 has first thermal protection surface 204 formed from a first surface material, and second engine component 202 has second thermal protection surface 206 formed from a second surface material different from the first surface material. Thermal protection space 208 is disposed between first and second thermal protection surfaces 204, 206. These configurations are representative of method 100 in which thermal protection structures and TLP or PTLP bonds are formed between thermal protection surfaces. It should be noted that in FIGS. 2A-2D, the dimensions of bonds 214A, 214B are exaggerated for clarity.

Typically, the first surface material can have a higher melting point than the second surface material, making first thermal protection surface 204 "more refractory" than second thermal protection surface 206. As a result there is substantial risk of mismatched thermal growth and/or thermal conduction when joining first surface 204 directly to second surface 206. Thus in FIG. 2A, first and second surfaces 204, 206 are spaced apart and space 208 is bridged with thermal protection structures 210A. Each structure 210A includes a single (e.g., first) thermal protection element 212A projecting from first thermal protection surface 204 into thermal protection space 208. TLP or PTLP bond 214A is then formed along distal edge 216A of each thermal protection structure 210A and second surface 206 to locally join surfaces 204 and 206 across thermal protection space 208.

Figure 2A:
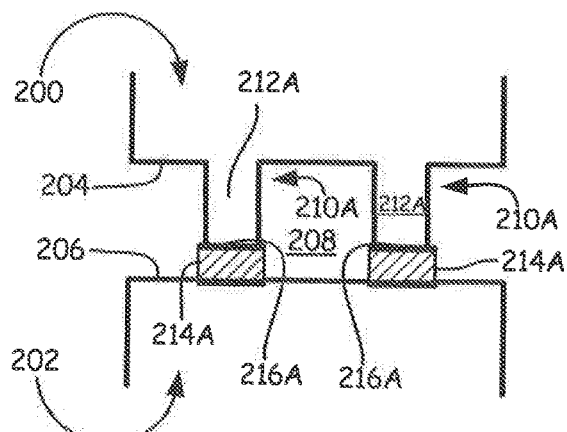
FIG. 2A depicts a first combination of the example thermal protection structure and transient liquid phase (TLP) or partial transient liquid phase (PTLP) bond.
Figure 2B:
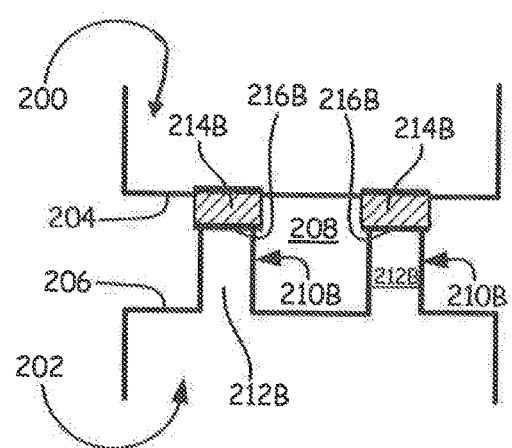
FIG. 2B depicts a second combination of the example thermal protection structure and TLP or PTLP bond.

FIG. 2B shows a similar configuration to FIG. 2A. The difference in FIG. 2B is that second thermal protection element 212B projects from second thermal protection surface 206 into thermal protection space 208 to form thermal protection structures 210B. In this instance a TLP or PTLP bond 214B is then formed along each distal edge 216B of thermal protection structures 210B and first surface 204, thereby locally joining first and second thermal protection surfaces 204 and 206 across thermal protection space 208.

Figure 2C:
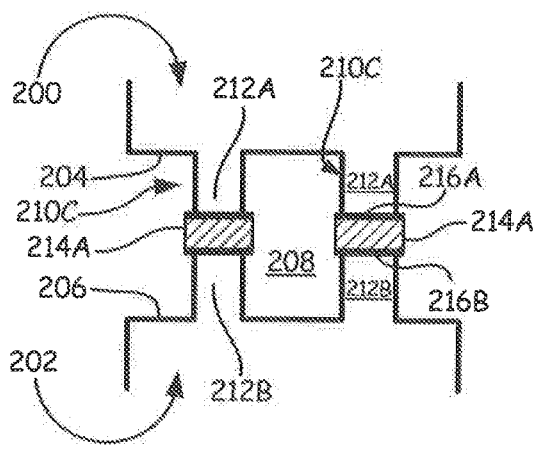
FIG. 2C depicts a third combination of the example thermal protection structure and TLP or PTLP bond.

In FIG. 2C, thermal protection structures 210C are defined by a combination of first thermal protection elements 212A and second thermal protection elements 212B. First and second thermal protection elements 212A, 212B each project from respective first and second thermal protection surfaces 204, 206 partially into thermal protection space 208. A TLP or PTLP bond 214A can then be added at each interface of distal edges 216A, 216B so that when second thermal protection elements 212B are properly aligned with first elements 212A, the bonded pair of opposed thermal protection elements define thermal protection structure 210C across space 208.

In certain embodiments, such as in the examples of FIGS. 2A-2C, one or both thermal protection elements 212A, 212B can be integrally formed with corresponding first and second thermal protection surfaces 204, 206. This can be done, for example, when thermal conductivity between engine component(s) 200, 202 is less of a concern and/or when materials of surfaces 204, 206 have compatible CTE values. In these embodiments, integration of first and/or second thermal protection elements 212A, 212B can be readily incorporated into the production of engine component(s) 200, 202, such as by casting or additive manufacturing.

Figure 2D:
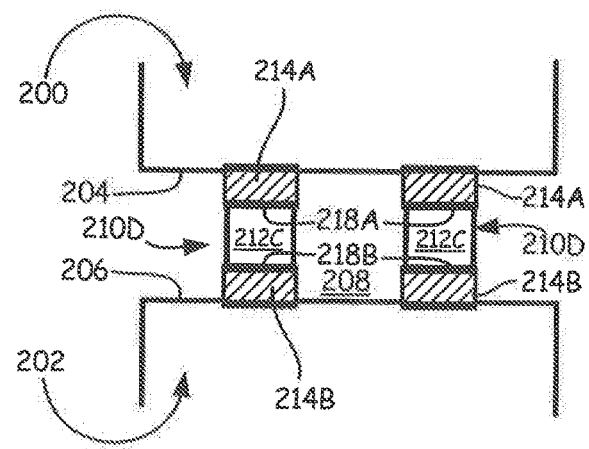
FIG. 2D depicts a fourth combination of the example thermal protection structure and TLP or PTLP bond.

FIG. 2D shows an alternative arrangement in which thermal protection structures 210D are joined to first and second thermal protection surface 204, 206 by TLP or PTLP bonds 214A and 214B. In other words, thermal protection structures 210D include separately formed thermal protection elements 212C which have respective TLP or PTLP bonds 214A, 214B joining first and second thermal protection surfaces 204, 206 to edges 218A, 218B of thermal protection elements 212C.

In certain embodiments, thermal protection structures 210A-210D can be made from the same material as one of the first and second thermal protection surfaces 204, 206. Examples are described with reference to FIG. 1 above. In certain alternative embodiments, such as those shown in FIG. 2D, thermal protection structures 210D can be made from a third material which has different composition from the materials of first and second thermal protection surfaces 204, 206. The third material can be less refractory than the first material and more refractory than the second material. It can additionally or alternatively have a lower thermal conductivity (i.e., be thermally insulating) relative to one or both of the first and second materials.

The third material of thermal protection structures 210D can, for example, be a compliant bridging material. In an example of joining two different ceramic surfaces (either monolithic ceramics or matrix binders of CMC materials), the compliant bridging material can be a third ceramic which is compatible with the TLP or PTLP bonding process, examples of which is shown in FIGS. 3A and 3B.

One or more of the configurations shown in FIGS. 2A-2D can be combined in the same joining region. For example, first engine component 200 can be joined to second engine component 202 using alternating instances or rows of two or more thermal protection structures 210A-210D so as to potentially enhance the overall bonding strength, and/or simplify the formation of the total number of TLP and/or PTLP bonds.

Figure 3A:
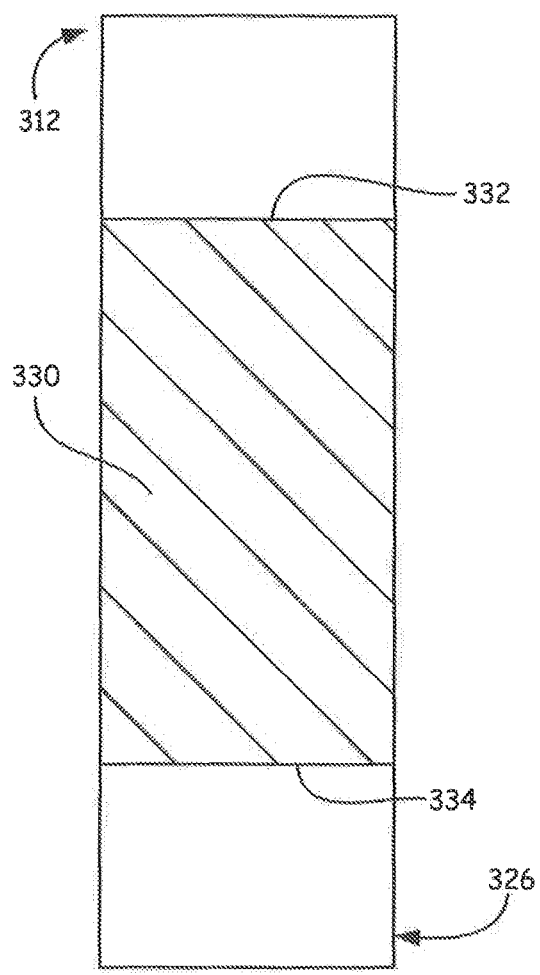
FIG. 3A shows formation of a TLP bond joining a thermal protection structure to an adjacent surface.
Figure 3B:
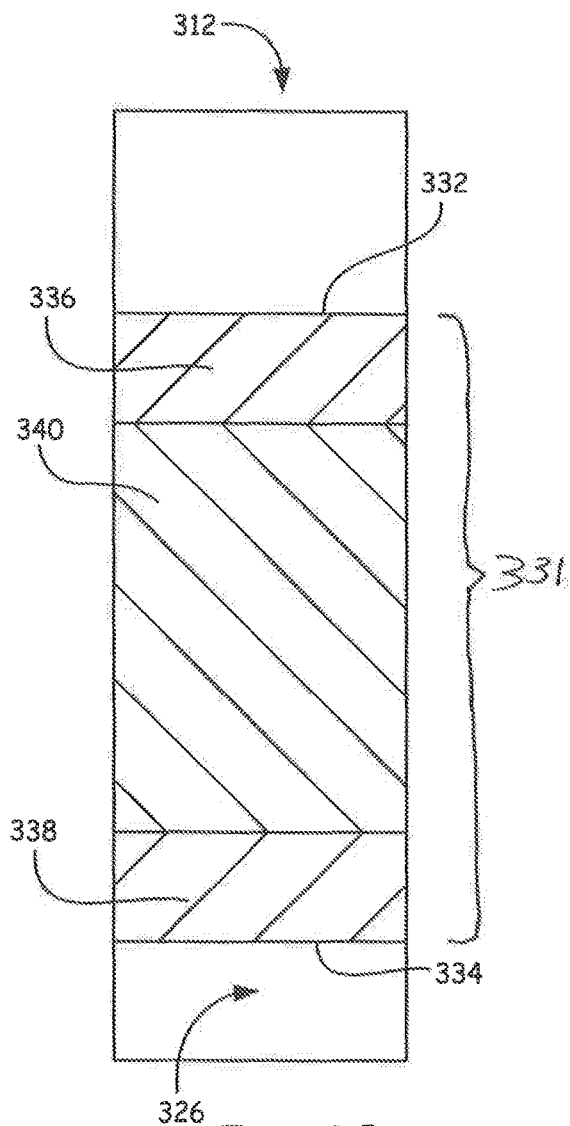
FIG. 3B shows formation of a PTLP bond joining a thermal protection structure to an adjacent surface.

FIGS. 3A and 3B respectively show a TLP bond and a PTLP bond joining a thermal protection element to an adjacent surface, such as is described in steps 110/114 of method 100. In these embodiments, standard TLP bonds typically work best for joining metallic materials while PTLP bonds typically work best for joining non-metallic materials (e.g., monolithic ceramic or ceramic matrix composite).

FIG. 3A depicts a standard TLP bond setup before joining thermal protection element 312 to adjacent bonding structure 326. Adjacent bonding structure 326 can include, for example, one of thermal protection surfaces 204, 206 shown in FIG. 2A, 2B, or 2D. Alternatively, adjacent bonding structure 326 can include a surface of a second thermal protection element such as element 212B depicted in FIG. 2C.

Standard TLP bonds include interlayer 330 which is diffused into the two bonding surfaces (surfaces 332 and 334 in FIG. 3A). TLP interlayer 330 begins as a foil, powder, braze paste, or other suitable format for applying the metallic material (e.g., electroplating or PVD). Pressure can be applied to the TLP bond setup along with heat to raise the temperature of the TLP bond assembly. The bonding temperature is above the original melting point of interlayer 330 before formation of the TLP bond.

When performing the TLP process, solid TLP interlayer 330 begins to diffuse into the substrate materials 312, 326 and then melts on reaching a suitable temperature. This temperature is either the direct melting point of interlayer 330 or, for each interface, it is the eutectic melting point of interlayer 330 and the respective substrate (e.g., 312 or 326). This causes a degree of meltback into substrates 312, 326 as equilibrium is attained. To control excessive meltback, TLP interlayer 330 can be provided with a similar composition to one of the substrates and/or can have a eutectic composition. After a sufficient bonding time, the liquefied interlayer 330 isothermally solidifies at the bonding temperature to form a standard TLP bond (e.g., bonds 214A, 214B shown in FIGS. 2A-2D). Optional homogenization of the TLP bond serves to further diffuse material into substrates 312, 326, and can increase the melting temperature of the resulting TLP bond.

FIG. 3B is an alternate bonding arrangement for thermal protection element 312 joined to adjacent bonding structure 326. To bond non-metallic substrates, FIG. 3B shows a PTLP bond setup with interlayer 331 which can include first layer 336, second layer 338, and refractory layer 340. Layers 336, 338 are shown as individual layers, but one or both layers 336, 338 can alternatively comprise multiple layers. Refractory layer 340 can be, for example, nickel or an alloy thereof. Alternative examples of suitable metals for refractory layer 340 include gold, cobalt, copper, niobium, palladium, platinum, silicon, tantalum, titanium, vanadium, and alloys thereof. Layers 336, 338 are selected so as to wet the ceramic substrates (here, surfaces 332, 334 when the bond assembly is heated to the bonding temperature. As layers 336, 338 are heated, they cause a controlled degree of meltback to refractory layer 340 while also wetting the adjacent ceramic surfaces 332, 334. This wetting can be caused directly by layers 336, 338 or by alloys formed on each side of the bond between layer 336 or 338 and refractory layer 340, respectively. The bond assembly can then be maintained at a bonding temperature for a suitable time so as to isothermally solidify and optionally homogenize the bonding materials into the interlayer.

In addition to joining two different components, a hybrid component made of dissimilar materials can also be produced via TLP bonding of one or more thermal protection structures. A space is left between the materials to minimize thermal conduction and/or provide cooling of the more refractory component. The combination of a hybrid design and thermal protection structures allow for complex geometries at a reasonable cost.

The remaining figures show various suitable geometries for thermal protection structures and hybrid components formed according to the preceding description.

Figure 4A:
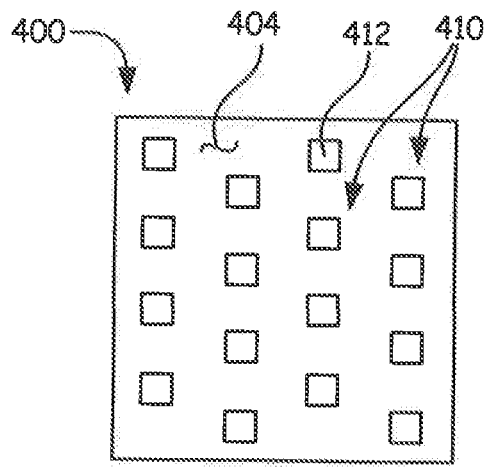
FIG. 4A is a second example thermal protection structure.
Figure 4B:
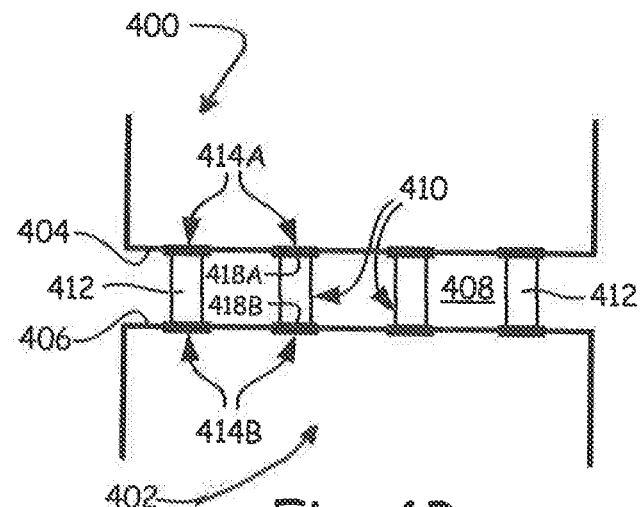
FIG. 4B shows example bond locations of the second example thermal protection structure.

FIGS. 4A and 4B show an array of first thermal protection structures 410 extending through thermal protection space 408 between first engine component 400 and second engine component 402. In FIG. 4A, an irregular array of thermal protection elements 412 having a polygonal cross-section are secured to, or are integrally formed with, first thermal protection surface 404. In this example, FIG. 4B shows rectangular thermal protection elements 412 while TLP or PTLP bonds 414A, 414B join edges 418A, 418B of thermal protection elements 412 to respective thermal protection surfaces 404, 406.

Figure 5A:
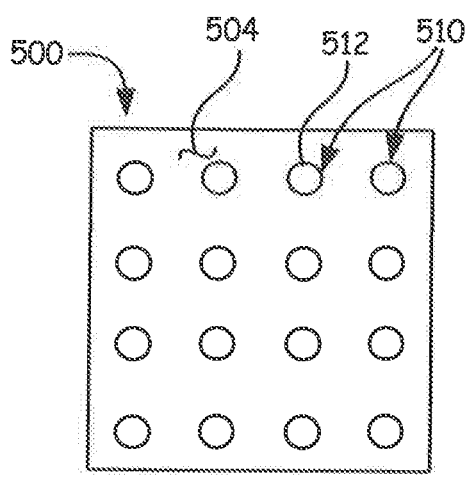
FIG. 5A is a third example thermal protection structure.
Figure 5B:
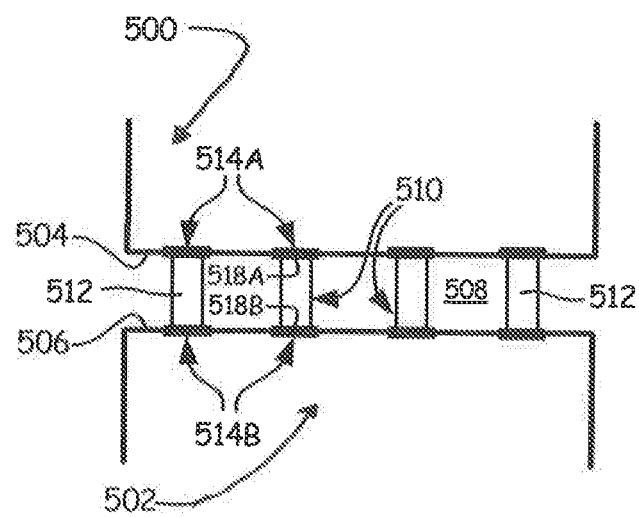
FIG. 5B shows example bond locations of the third example thermal protection structure.

FIGS. 5A and 5B show an array of first thermal protection structures 510 extending through thermal protection space 508 between first engine component 500 and second engine component 502. In FIG. 5A, a regular array of thermal protection elements 512 having a round or curved cross-section are secured to, or are integrally formed with, first thermal protection surface 504 of first engine component 500. In this example, FIG. 5B shows circular thermal protection elements 512 with TLP or PTLP bonds 514A, 514B joining edges 518A, 518B of thermal protection elements 512 to respective thermal protection surfaces 504, 506.

FIGS. 5A and 5B show similar arrays of first thermal protection structures having a rounded (circular, oval, etc.) cross-section. The array of protrusions can be of any cross-sectional shape, and can either be arranged in a regular grid (FIG. 5A) or an offset grid (FIG. 4A). The plurality of individual protrusions can extend generally normal to at least one of the first thermal protection surface and the second thermal protection surface. It will be appreciated that any regular, irregular, or random pattern of protrusions can be used, for example, to address hot spots, areas of potential fatigue or weakness or the like.

In certain embodiments, a second plurality of thermal protection structures is also positioned across the thermal protection space between the first and second thermal protection surfaces.

Figure 6A:
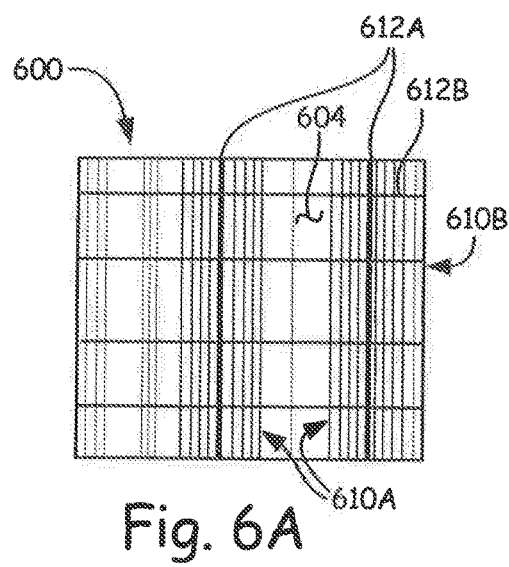
FIG. 6A is a fourth example thermal protection structure.
Figure 6B:
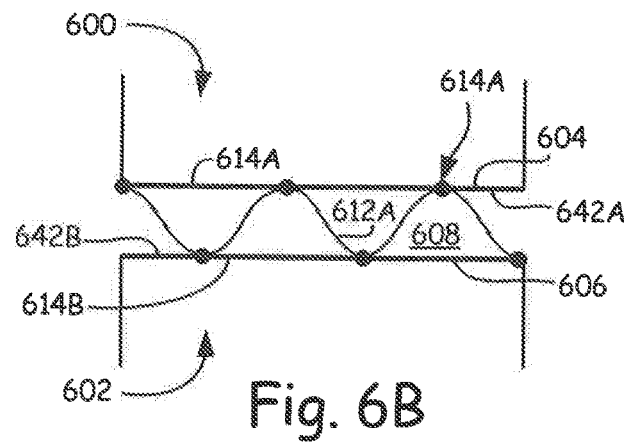
FIG. 6B shows example bond locations of the fourth example thermal protection structure.

A first example of an assembly with multiple thermal protection structures is shown in FIGS. 6A-6B in which a plurality of corrugated ribs 612A serve as first thermal protection structures 610A across thermal protection space 608 between first engine component 600 and second engine component 602. First TLP or PTLP bonds 614A, 614B are disposed along first thermal protection structures 610A to locally join first thermal protection surface 604 and second thermal protection surface 606

FIGS. 6A and 6B also show a set of second, longitudinal ribs 612B arranged transversely to corrugated ribs 612A. A corresponding group of TLP or PTLP bonds 642A, 642B also locally join thermal protection surfaces 604, 606. In the absence of longitudinal ribs 612B, corrugated ribs 612A can define longitudinal passages along space 608.

Figure 7A:
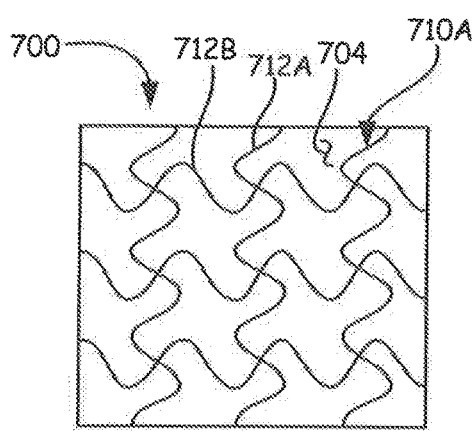
FIG. 7A is a fifth example thermal protection structure.
Figure 7B:
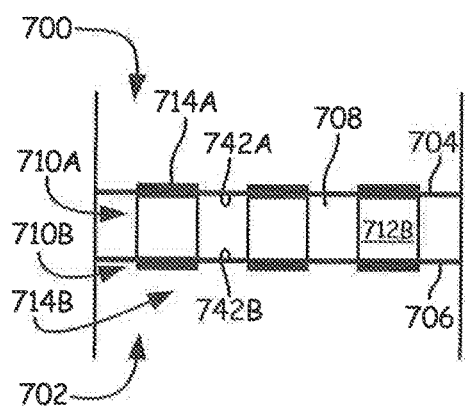
FIG. 7B shows example bond locations of the fifth example thermal protection structure.

In FIGS. 7A and 7B, first thermal protection structures 710A, 710B also have a plurality of corrugated ribs 712A, 712B serving as first thermal protection structures 710A across thermal protection space 708 between first engine component 700 and second engine component 702. As in FIGS. 6A and 6B, first TLP or PTLP bonds 714A, 714B are disposed along first thermal protection structures 710A to locally join first thermal protection surface 704 and second thermal protection surface 706.

In place of the longitudinal transverse ribs, FIG. 7A shows a set of second corrugated ribs 712B arranged transversely to first corrugated ribs 712A. FIG. 7B illustrates how both sets of ribs 712A, 712B can be disposed across thermal protection space 708 between first engine component 700 and second engine component 702. Second TLP or PTLP bonds 742A, 742B are formed along respective corresponding ones of the first and second thermal protection structures 710A, 710B to locally join thermal protection surfaces 704, 706.

It will be appreciated that, with respect to FIGS. 6A-7B not all of the thermal protection structures are required to be ribs. For example, some or all of the ribs can be replaced by isolated projections as shown in FIGS. 4A-5B.

Figure 8A:
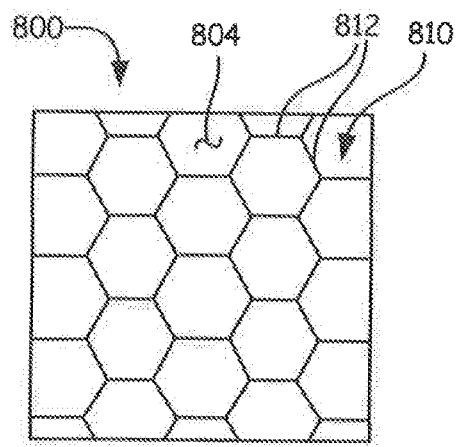
FIG. 8A is a sixth example thermal protection structure.
Figure 8B:
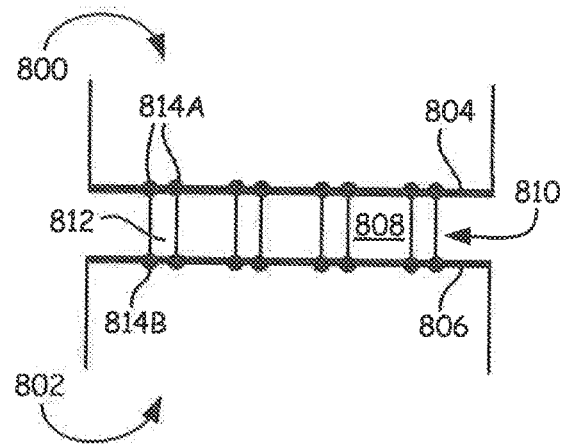
FIG. 8B shows example bond locations of the sixth example thermal protection structure.

The final two non-limiting examples are shown in FIGS. 8A-9B. In FIGS. 8A-8B, a plurality of first thermal protection structures 810 include an interconnected grid of repeating polygonal shapes extending across space 808, between first and second thermal protection surfaces 804, 806 of respective first and second engine components 900, 902. In FIG. 8A, a grid of ribs 812 are arranged into interlocking hexagonal shapes. Alternatively, ribs 812 can be arranged so that the hexagons are replaced with a rectangular grid or a triangular isogrid. TLP or PTLP bonds 814A, 814B complete connection of first and second components 800, 802.

Figure 9A:
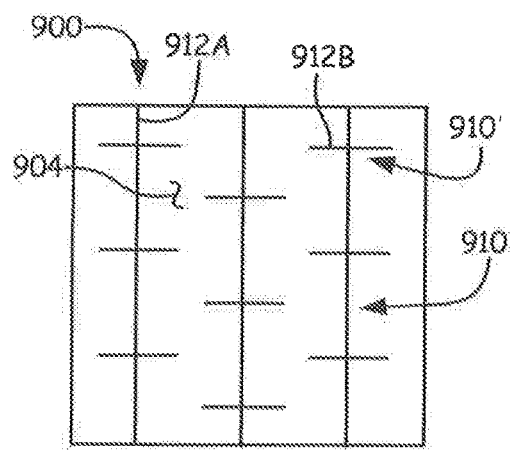
FIG. 9A is a seventh example thermal protection structure.
Figure 9B:
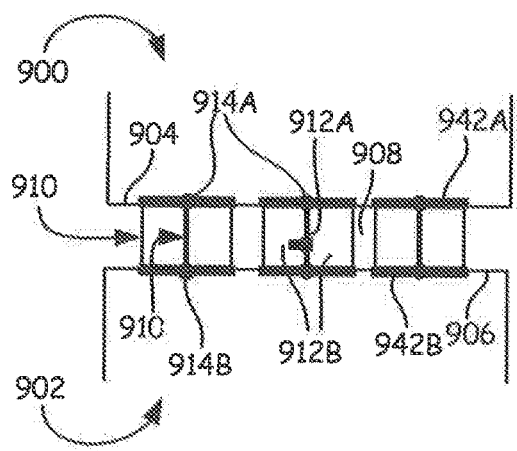
FIG. 9B shows example bond locations of the seventh example thermal protection structure.

FIGS. 9A-9B shows an irregular grid arrangement of transversely arranged thermal protection structures 910 connecting first and second engine components 900, 902. First ribs 912A extend longitudinally along space 908 between thermal protection surfaces 904, 906, while second rib segments 912B are arranged in an irregular manner transversely to first rib segments 912A. First TLP or PTLP bonds 914A, 914B secure ribs 912A in place, while second TLP or PTLP bonds 942A, 942B secure transverse ribs 912B.

Discussion of Possible Embodiments

The following are non-exclusive descriptions of possible embodiments of the present invention.

A method for joining engine components comprises providing a first engine component with a first thermal protection surface and a second engine component with a second thermal protection surface. The second thermal protection surface is formed from a second surface material different from a first surface material of the first thermal protection surface. The first and second thermal protection surfaces are arranged to have at least one thermal protection space therebetween. A first plurality of thermal protection structures are positioned across the thermal protection space between the first thermal protection surface and the second thermal protection surface. The first engine component and the second engine component are locally joined by forming a first plurality of transient liquid phase (TLP) or partial transient liquid phase (PTLP) bonds along corresponding ones of the first plurality of thermal protection structures between the first thermal protection surface and the second thermal protection surface.

The method of the preceding paragraph can optionally include, additionally and/or alternatively, any one or more of the following features, configurations and/or additional components:

A method for joining engine components according to an exemplary embodiment of this disclosure, among other possible things includes providing a first engine component including a first thermal protection surface formed from a first surface material; providing a second engine component including a second thermal protection surface formed from a second surface material different from the first surface material; arranging the first and second thermal protection surfaces to have at least one thermal protection space therebetween; positioning a plurality of first thermal protection structures across the thermal protection space between the first thermal protection surface and the second thermal protection surface; and locally joining the first engine component and the second engine component by forming a plurality of first transient liquid phase (TLP) or partial transient liquid phase (PTLP) bonds along corresponding ones of the plurality of first thermal protection structures between the first thermal protection surface and the second thermal protection surface.

A further embodiment of the foregoing method, wherein at least one of the first surface material and the second surface material is selected from one of: a ceramic material, a metallic material, a ceramic matrix composite (CMC) material, and a metal matrix composite (MMC) material.

A further embodiment of any of the foregoing methods, wherein the ceramic material comprises one or more of: aluminum oxide ($Al_2O_3$), silicon nitride ($Si_3N_4$), silicon carbide (SiC), tungsten carbide (WC), and zirconium oxide ($ZrO_2$).

A further embodiment of any of the foregoing methods, wherein the CMC material comprises a plurality of fibers selected from one or more of: silicon carbide (SiC), titanium carbide (TiC), aluminum oxide ($Al_2O_3$), and carbon (C).

A further embodiment of any of the foregoing methods, wherein the CMC material comprises a ceramic matrix selected from one or more of: aluminum oxide ($Al_2O_3$), silicon nitride ($Si_3N_4$), and silicon carbide (SiC).

A further embodiment of any of the foregoing methods, wherein the MMC material comprises a plurality of fibers selected from one or more of: silicon carbide (SiC), titanium carbide (TiC), aluminum oxide ($Al_2O_3$), carbon (C), boron (B), boron carbide ($B_4C$), graphite, steel, tungsten (W), and titanium boride ($TiB_2$).

A further embodiment of any of the foregoing methods, wherein at least one of the first engine component and the second engine component is a turbine engine component.

A further embodiment of any of the foregoing methods, wherein the turbine engine component is a hot section component.

A further embodiment of any of the foregoing methods, wherein at least one of the first thermal protection structures comprises: a first thermal protection element projecting from the first thermal protection surface into the thermal protection space.

A further embodiment of any of the foregoing methods, wherein the first thermal protection element is integrally formed with the first engine component.

A further embodiment of any of the foregoing methods, wherein the first thermal protection element is joined to the first engine component by at least one of the plurality of first TLP or PTLP bonds.

A further embodiment of any of the foregoing methods, wherein at least one of the first thermal protection structures further comprises: a second thermal protection element projecting from the second thermal protection surface into the thermal protection space, the second thermal protection element aligned with the first thermal protection element to define a thermal protection structure having a pair of opposed thermal protection elements.

A further embodiment of any of the foregoing methods, wherein the second thermal protection element is integrally formed with the second engine component.

A further embodiment of any of the foregoing methods, further comprising: joining the second thermal protection element to the second engine component by at least one of the plurality of first TLP or PTLP bonds.

A further embodiment of any of the foregoing methods, further comprising: joining the second thermal protection element to the first thermal protection element by at least one of the plurality of first TLP or PTLP bonds.

A further embodiment of any of the foregoing methods, wherein at least one of first thermal protection structures comprises a plurality of individual protrusions extending generally normal to at least one of the first thermal protection surface and the second thermal protection surface.

A further embodiment of any of the foregoing methods, wherein the plurality of first thermal protection structures comprises a plurality of corrugated ribs extending between the first thermal protection surface and the second thermal protection surface.

A further embodiment of any of the foregoing methods, wherein the plurality of first thermal protection structures comprises an irregular grid of ribs extending between the first thermal protection surface and the second thermal protection surface.

A further embodiment of any of the foregoing methods, wherein the plurality of first thermal protection structures comprises an interconnected grid of repeating polygon shapes extending between the first thermal protection surface and the second thermal protection surface.

A further embodiment of any of the foregoing methods, wherein the plurality of first thermal protection structures comprises an interconnected grid of repeating geometric shapes extending between the first thermal protection surface and the second thermal protection surface.

A further embodiment of any of the foregoing methods, further comprising: ositioning a plurality of second thermal protection structures across the thermal protection space between the first thermal protection surface and the second thermal protection surface; and ocally joining the first engine component and the second engine component by forming a plurality of second transient liquid phase (TLP) bonds along corresponding ones of the plurality of second thermal protection structures between the first thermal protection surface and the second thermal protection surface.

A further embodiment of any of the foregoing methods, wherein the positioning step comprises: aranging the plurality of second thermal protection structures transversely to at least some of the first plurality of thermal protection structures.

A further embodiment of any of the foregoing methods, wherein the plurality of second thermal protection structures comprises a plurality of ribs extending between the first thermal protection surface and the second thermal protection surface.

A further embodiment of any of the foregoing methods, wherein the plurality of ribs are corrugated.

A further embodiment comprising an engine component formed according to any of the preceding embodiments.

Although the present invention has been described with reference to preferred embodiments, workers skilled in the art will recognize that changes may be made in form and detail without departing from the spirit and scope of the invention.

The invention claimed is:

1. An assembly comprising:
a first engine component including a first thermal protection surface formed from a first surface material;
a second engine component including a second thermal protection surface formed from a second surface material different from the first surface material, the first and second thermal protection surfaces arranged to define at least one thermal protection space therebetween;
a plurality of first thermal protection structures positioned across the thermal protection space between the first thermal protection surface and the second thermal protection surface; and
a plurality of first transient liquid phase (TLP) or partial transient liquid phase (PTLP) bonds formed along corresponding ones of the plurality of first thermal protection structures between the first thermal protection surface and the second thermal protection surface, thereby locally joining the first engine component and the second engine component;
wherein each of the first surface material and the second surface material is selected from one of a ceramic material and a ceramic matrix composite (CMC) material, the first surface material being more refractory than the second surface material; and
wherein the at least one thermal protection space provides at least one of secondary coolant flow and leakage coolant flow between the first and second thermal protection surfaces.

2. The assembly of claim 1, wherein the ceramic material comprises one or more of: aluminum oxide ($Al_2O_3$), silicon nitride ($Si_3N_4$), silicon carbide (SiC), tungsten carbide (WC), and zirconium oxide ($ZrO_2$).

3. The assembly of claim 1, wherein the CMC material comprises a plurality of fibers selected from one or more of: silicon carbide (SiC), titanium carbide (TiC), aluminum oxide ($Al_2O_3$), and carbon (C).

4. The assembly of claim 1, wherein the CMC material comprises a ceramic matrix selected from one or more of: aluminum oxide ($Al_2O_3$), silicon nitride ($Si_3N_4$), and silicon carbide (SiC).

5. The assembly of claim 1, wherein at least one of the first engine component and the second engine component is a turbine engine component.

6. The assembly of claim 5, wherein the turbine engine component is a component for a combustor section or a turbine section of the turbine engine.

7. The assembly of claim 1, wherein at least one of the first thermal protection structures comprises:
a first thermal protection element projecting from the first thermal protection surface into the thermal protection space.

8. The assembly of claim 7, wherein the first thermal protection element is integrally formed with the first engine component.

9. The assembly of claim 7, wherein the first thermal protection element is joined to the first engine component by at least one of the plurality of first TLP or PTLP bonds.

10. The assembly of claim 7, wherein at least one of the first thermal protection structures further comprises:
a second thermal protection element projecting from the second thermal protection surface into the thermal protection space, the second thermal protection element aligned with the first thermal protection element to define a thermal protection structure having a pair of opposed thermal protection elements.

11. The assembly of claim 10, wherein the second thermal protection element is integrally formed with the second engine component.

12. The assembly of claim 10, wherein the second thermal protection element is joined to the second engine component by at least one of the plurality of first TLP or PTLP bonds.

13. The assembly of claim 10, wherein the second thermal protection element is joined to the first thermal protection element by at least one of the plurality of first TLP or PTLP bonds.

14. The assembly of claim 1, wherein at least one of first thermal protection structures comprises a plurality of individual protrusions extending generally normal to at least one of the first thermal protection surface and the second thermal protection surface.

15. The assembly of claim 1, wherein the plurality of first thermal protection structures comprises a plurality of corrugated ribs extending between the first thermal protection surface and the second thermal protection surface.

16. The assembly of claim 1, wherein the plurality of first thermal protection structures comprises an irregular grid of ribs extending between the first thermal protection surface and the second thermal protection surface.

17. The assembly of claim 1, wherein the plurality of first thermal protection structures comprises an interconnected grid of repeating polygon shapes extending between the first thermal protection surface and the second thermal protection surface.

18. The assembly of claim 1, wherein the plurality of first thermal protection structures comprises an interconnected grid of repeating geometric shapes extending between the first thermal protection surface and the second thermal protection surface.

19. The assembly of claim 1, further comprising:
a plurality of second thermal protection structures positioned across the thermal protection space between the first thermal protection surface and the second thermal protection surface; wherein
the first engine component and the second engine component are locally joined by a plurality of second transient liquid phase (TLP) bonds positioned along corresponding ones of the plurality of second thermal protection structures between the first thermal protection surface and the second thermal protection surface.

20. The assembly of claim 19, wherein the plurality of second thermal protection structures are arranged transversely to at least some of the first plurality of thermal protection structures.

21. The assembly of claim 19, wherein the plurality of second thermal protection structures comprises a plurality of ribs extending between the first thermal protection surface and the second thermal protection surface.

22. The assembly of claim 21, wherein the plurality of ribs are corrugated.

* * * * *